US012243465B2

(12) United States Patent
Jang et al.

(10) Patent No.: US 12,243,465 B2
(45) Date of Patent: Mar. 4, 2025

(54) DISPLAY PIXEL NON-UNIFORMITY COMPENSATION

(71) Applicant: Apple Inc., Cupertino, CA (US)

(72) Inventors: Sunmin Jang, Sunnyvale, CA (US); Mahdi Farrokh Baroughi, Santa Clara, CA (US); Saif Choudhary, San Jose, CA (US); Hopil Bae, Palo Alto, CA (US); Gautam Agrawal, Santa Clara, CA (US); Ionut A Mirel, Cupertino, CA (US); Hari P Paudel, Milpitas, CA (US); Haitao Li, Mountain View, CA (US); Wei H Yao, Palo Alto, CA (US); Mahesh B Chappalli, San Jose, CA (US); Young Don Bae, San Jose, CA (US)

(73) Assignee: Apple Inc., Cupertino, CA (US)

( * ) Notice: Subject to any disclaimer, the term of this patent is extended or adjusted under 35 U.S.C. 154(b) by 29 days.

(21) Appl. No.: 18/296,934

(22) Filed: Apr. 6, 2023

(65) Prior Publication Data

US 2023/0368718 A1 Nov. 16, 2023

Related U.S. Application Data

(60) Provisional application No. 63/340,841, filed on May 11, 2022.

(51) Int. Cl.
*G09G 3/20* (2006.01)
*G09G 3/32* (2016.01)

(52) U.S. Cl.
CPC ............. *G09G 3/2007* (2013.01); *G09G 3/32* (2013.01); *G09G 2300/0426* (2013.01); *G09G 2310/0264* (2013.01); *G09G 2310/08* (2013.01); *G09G 2320/02* (2013.01); *G09G 2320/0626* (2013.01); *G09G 2360/16* (2013.01)

(58) Field of Classification Search
CPC .................. G09G 3/2007; G09G 3/32; G09G 2300/0426; G09G 2310/0264; G09G 2310/08; G09G 2320/02; G09G 2320/0626; G09G 2360/16; G09G 2320/0242; G09G 2320/0285; G09G 2320/0693; G09G 2320/0233
See application file for complete search history.

(56) References Cited

U.S. PATENT DOCUMENTS

| | | | |
|---|---|---|---|
| 8,073,247 | B1 | 12/2011 | Sandrew et al. |
| 2005/0231446 | A1 | 10/2005 | Lee et al. |
| 2006/0038807 | A1 | 2/2006 | Eckhardt et al. |

(Continued)

OTHER PUBLICATIONS

International Search Report a& Written Opinion for PCT Application No. PCT/US2023/021304 dated Aug. 2, 2023; 14 pgs.

*Primary Examiner* — Temesghen Ghebretinsae
*Assistant Examiner* — Ivelisse Martinez Quiles
(74) *Attorney, Agent, or Firm* — Fletcher Yoder, P.C.

(57) ABSTRACT

To reduce image artifacts and non-uniformity associated with a display pixel of an electronic display, processing circuitry may adjust a luminance value corresponding to a display pixel according to a per-pixel gain mask, a per-pixel anode mask, or both. To further correct for the non-uniformity, the processing circuitry may convert the luminance value to a digital code based on a curve associated with an anode on which the display pixel is located.

23 Claims, 15 Drawing Sheets

(56) References Cited

U.S. PATENT DOCUMENTS

| | | | | |
|---|---|---|---|---|
| 2007/0052735 | A1 | 3/2007 | Chou | |
| 2010/0123699 | A1 | 5/2010 | Leon et al. | |
| 2011/0292087 | A1 | 12/2011 | Lim | |
| 2017/0092180 | A1 * | 3/2017 | Cote | G09G 3/3225 |
| 2020/0302871 | A1 | 9/2020 | Zhang et al. | |
| 2022/0358867 | A1 | 11/2022 | Paudel et al. | |

* cited by examiner

DISPLAY PIXEL NON-UNIFORMITY COMPENSATION

CROSS-REFERENCE TO RELATED APPLICATIONS

This application claims priority to U.S. Provisional Application No. 63/340,841, filed May 11, 2022, entitled "Display Pixel Non-Uniformity Compensation," the disclosure of which is incorporated by reference in its entirety for all purposes.

SUMMARY

The present disclosure relates generally to electronic devices with display panels, and more particularly, to compensating for non-uniformity associated with a display pixel of a display panel.

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Electronic displays may display images that present visual representations of information. Accordingly, numerous electronic systems—such as computers, mobile phones, portable media devices, tablets, televisions, virtual-reality headsets, and vehicle dashboards, among many others—often include or use electronic displays. In any case, an electronic display may generally display an image by actively controlling light emission from its display pixels. By adjusting the brightness of different color components of the display pixels, a variety of different colors may be generated that collectively produce a corresponding image.

Different display pixels may emit different colors. For example, some of the display pixels may emit red light, some may emit green light, and some may emit blue light. Thus, the display pixels may be driven to emit light at different brightness levels to cause a user viewing the display to perceive an image formed from different colors of light. The display pixels may also correspond to sub-pixels of pixels of other color combinations, such as cyan (C), magenta (M), or the like. As used in this disclosure, the term "display pixel" refers to a sub-pixel (e.g., a red, green, or blue sub-pixel of an RGB pixel; a cyan, magenta, or yellow sub-pixel of a CMY pixel) of an electronic display.

The electronic display may take a variety of forms. For example, the electronic display may be a digital display such as a micro-light-emitting diode (LED) display. A micro-LED display includes active matrixes of micro-LEDs, pixel drivers (e.g., referred to as micro-drivers), anodes, and arrays of row and column drivers. Each micro-driver may drive a number of display pixels on the electronic display. For example, each micro-driver may be connected to numerous anodes, and each anode may selectively connect to multiple different display pixels (one at a time). Thus, a collection of display pixels may share a common anode connected to a micro-driver. The micro-driver may drive a display pixel by providing a driving signal across an anode to one of the collection of display pixels. Any suitable number of display pixels may be located on respective anodes of the micro-LED display. Moreover, the collection of display pixels located on each anode may be the same particular color (e.g., red, green, blue).

In some cases, display pixel current mismatch, display pixel efficiency, anode capacitance, display pixel capacitance, or spline capacitance (e.g., capacitance at spline borders), among other parameters, may cause display pixel non-uniformity. Such display pixel non-uniformity could result in an undesirable image artifact (e.g., some display pixels brighter or darker than others, random vertical lines, repeating vertical lines) when image content is displayed on the micro-LED display. Image artifacts and visual errors resulting from display pixel non-uniformity may disrupt the desired effect or experience for users when viewing image content on the micro-LED display. Yet replacing entire micro-LED displays due to display pixel non-uniformity may be costly, time consuming, and inefficient. Accordingly, compensating for display pixel non-uniformity may be desirable to manufacturers as well as to users viewing the image content on the micro-LED displays.

Accordingly, the present disclosure provides techniques for compensating for display pixel non-uniformity on an electronic display (e.g., micro-LED display). In some embodiments, the micro-LED display may be part of an electronic device. In other embodiments, the micro-LED display may be part of an external electronic display communicatively coupled to the electronic device. Processing circuitry (e.g., image processing circuitry, image compensation circuitry) of the electronic device or the micro-LED display may receive image data associated with displaying image content on the micro-LED display. In other embodiments, the processing circuitry may generate the image data. The processing circuitry may apply a specific sub-pixel uniformity compensation to the image data so that, when the display pixels are driven by the micro-drivers, each display pixel emits the same amount of light for the same gray level as the other display pixels.

When the processing circuitry receives the image data corresponding to a display pixel of the micro-LED display, the image data may be defined as gray levels for the various display pixels. Pixel by pixel, the processing circuitry may convert the gray level of the image data into a luminance value in the luminance domain representing an amount of light corresponding to the gray level. To compensate for non-uniformity associated with each display pixel compared to other display pixels of the electronic display, the processing circuitry may adjust the luminance value for a particular display pixel based on a gain obtained from one or more gain masks to partially correct for the display pixel non-uniformity. As used herein, a gain mask is a table (e.g., lookup table) that indicates respective gain values applied to luminance values of respective display pixels to compensate for display pixel uniformity (e.g., reducing or decreasing the luminance value of the display pixel according to the gain mask).

To further correct for display pixel non-uniformity, the processing circuitry may convert the adjusted luminance value from the luminance domain to a digital code based on a curve associated with an anode on which the display pixel is located. As used herein, the digital code is a digital form (e.g., digital signal) that causes a micro-driver to drive the display pixel to emit a particular amount light with respect to the image data and based on a timing controller. As described in detail below, a micro-driver of the micro-LED display that controls the display pixel drives the display pixel according to the digital code. In some embodiments, the digital code may take the form of a gray level, and the micro-driver may drive the display pixel according to the gray level. The processing circuitry may retrieve a stored copy of the curve from memory (e.g., a lookup table stored in memory), which may be stored based on a calibration during manufacturing (e.g., from calibration circuitry that may represent processing circuitry external from the electronic device and micro-LED display).

Given input values associated with display pixels, the lookup table identifies curves associated with respective anodes on which respective display pixels are located. In some embodiments, each anode may be associated with a different curve. In other embodiments, two or more anodes may share the same curve. For example, during manufacturing, the calibration circuitry may determine that the two or more anodes are eligible to share the same curve using techniques such as curve binning, parametric binning, spatial binning, and so forth. Binning may be used to determine that two or more anodes are eligible to share the same curve based on display parameters, display pixel positions, or both. Display parameters may include temperature, current frequency, brightness, panel physics, and so forth associated with display pixels. As used herein, panel physics may refer to properties such as capacitance associated with a micro-LED display. For example, micro-LED displays manufactured by different vendors may be associated with different capacitance values. Binning may allow a fewer number of curves to be stored compared to the number of anodes of the micro-LED display. For example, the micro-LED display may include between 50,000 and 100,000 anodes, on which respective display pixels are located. Rather than using a unique curve for each of the 50,000 to 100,000 anodes, based on binning, many fewer curves may be used. In some cases, there may be as few curves as there are different anodes per micro-driver, since many of the same anode-specific non-uniformities may be due to the relative placement of each anode with respect to the microdriver (e.g., different length of anode, different distance from the micro-driver). In some cases, for between 50,000 and 100,000 anodes, there may be as few as 10 to 20 curves per color. After compensating for non-uniformity, image artifacts associated with display pixel non-uniformity on the micro-LED display may be reduced. Display pixels associated with non-uniformity may be identified during manufacture and locations of the display pixels associated with non-uniformity may be stored in memory accessible to the processing circuitry.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions are made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

Figure 1:
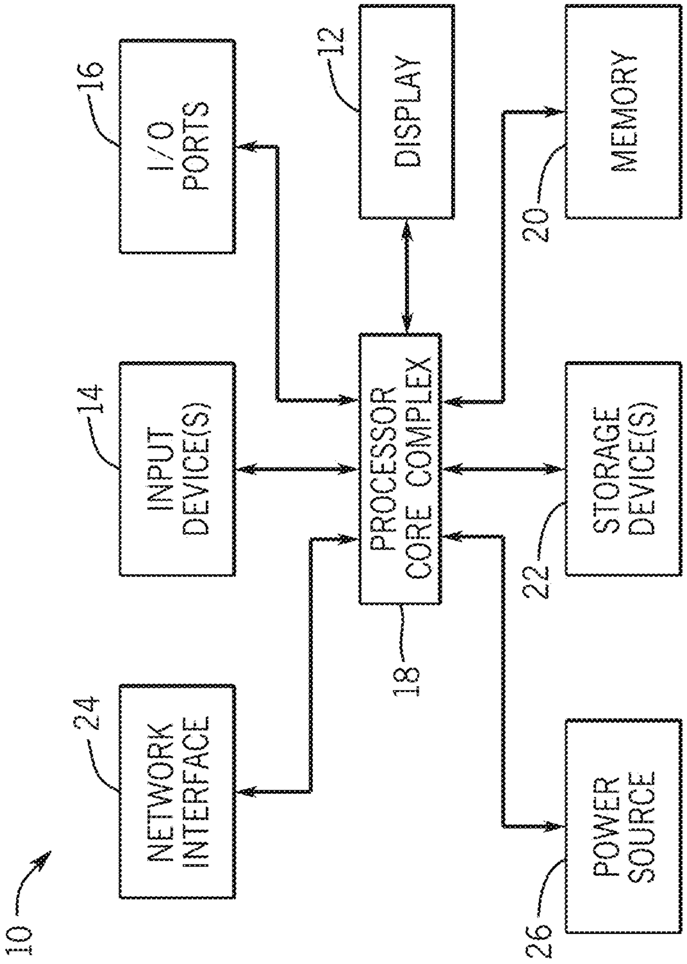
FIG. 1 is a block diagram of an electronic device with an electronic display, in accordance with an embodiment of the present disclosure.

With the preceding in mind and to help illustrate, an electronic device 10 including an electronic display 12 is shown in FIG. 1. As is described in more detail below, the electronic device 10 may be any suitable electronic device, such as a computer, a mobile phone, a portable media device, a tablet, a television, a virtual-reality headset, a wearable device such as a watch, a vehicle dashboard, or the like. Thus, it should be noted that FIG. 1 is merely one example of a particular implementation and is intended to illustrate the types of components that may be present in an electronic device 10.

The electronic device 10 includes the electronic display 12, one or more input devices 14, one or more input/output (I/O) ports 16, a processor core complex 18 having one or more processing circuitry(s) or processing circuitry cores, local memory 20, a main memory storage device 22, a network interface 24, and a power source 26 (e.g., power supply). The various components described in FIG. 1 may include hardware elements (e.g., circuitry), software elements (e.g., a tangible, non-transitory computer-readable medium storing executable instructions), or a combination of both hardware and software elements. It should be noted that the various depicted components may be combined into fewer components or separated into additional components. For example, the local memory 20 and the main memory storage device 22 may be included in a single component.

The processor core complex 18 is operably coupled with local memory 20 and the main memory storage device 22. Thus, the processor core complex 18 may execute instructions stored in local memory 20 or the main memory storage device 22 to perform operations, such as generating or transmitting image data to display on the electronic display 12. As such, the processor core complex 18 may include one or more general purpose microprocessors, one or more application specific integrated circuits (ASICs), one or more field programmable logic arrays (FPGAs), or any combination thereof.

In addition to program instructions, the local memory 20 or the main memory storage device 22 may store data to be processed by the processor core complex 18. Thus, the local memory 20 and/or the main memory storage device 22 may include one or more tangible, non-transitory, computer-readable media. For example, the local memory 20 may include random access memory (RAM) and the main memory storage device 22 may include read-only memory (ROM), rewritable non-volatile memory such as flash memory, hard drives, optical discs, or the like.

The network interface 24 may communicate data with another electronic device or a network. For example, the network interface 24 (e.g., a radio frequency system) may enable the electronic device 10 to communicatively couple to a personal area network (PAN), such as a Bluetooth network, a local area network (LAN), such as an 802.11x Wi-Fi network, or a wide area network (WAN), such as a 4G, Long-Term Evolution (LTE), or 5G cellular network. The power source 26 may provide electrical power to one or more components in the electronic device 10, such as the processor core complex 18 or the electronic display 12. Thus, the power source 26 may include any suitable source of energy, such as a rechargeable lithium polymer (Li-poly) battery or an alternating current (AC) power converter. The I/O ports 16 may enable the electronic device 10 to interface with other electronic devices. For example, when a portable storage device is connected, the I/O port 16 may enable the processor core complex 18 to communicate data with the portable storage device.

The input devices 14 may enable user interaction with the electronic device 10, for example, by receiving user inputs via a button, a keyboard, a mouse, a trackpad, or the like. The input device 14 may include touch-sensing components in the electronic display 12. The touch sensing components may receive user inputs by detecting occurrence or position of an object touching the surface of the electronic display 12.

In addition to enabling user inputs, the electronic display 12 may include a display panel with one or more display pixels. The electronic display 12 may control light emission from the display pixels to present visual representations of information, such as a graphical user interface (GUI) of an operating system, an application interface, a still image, or video content, by displaying frames of image data. To display images, the electronic display 12 may include display pixels implemented on the display panel. The display pixels may represent sub-pixels that each control a luminance value of one color component (e.g., red, green, or blue for an RGB pixel arrangement or red, green, blue, or white for an RGBW arrangement).

The electronic display 12 may display an image by controlling light emission from its display pixels based on pixel or image data associated with corresponding image pixels (e.g., points) in the image. In some embodiments, pixel or image data may be generated by an image source, such as the processor core complex 18, a graphics processing unit (GPU), or an image sensor. Additionally, in some embodiments, image data may be received from another electronic device 10, for example, via the network interface 24 and/or an I/O port 16. Similarly, the electronic display 12 may display frames based on pixel or image data generated by the processor core complex 18, or the electronic display 12 may display frames based on pixel or image data received via the network interface 24, an input device, or an I/O port 16.

Figure 2:
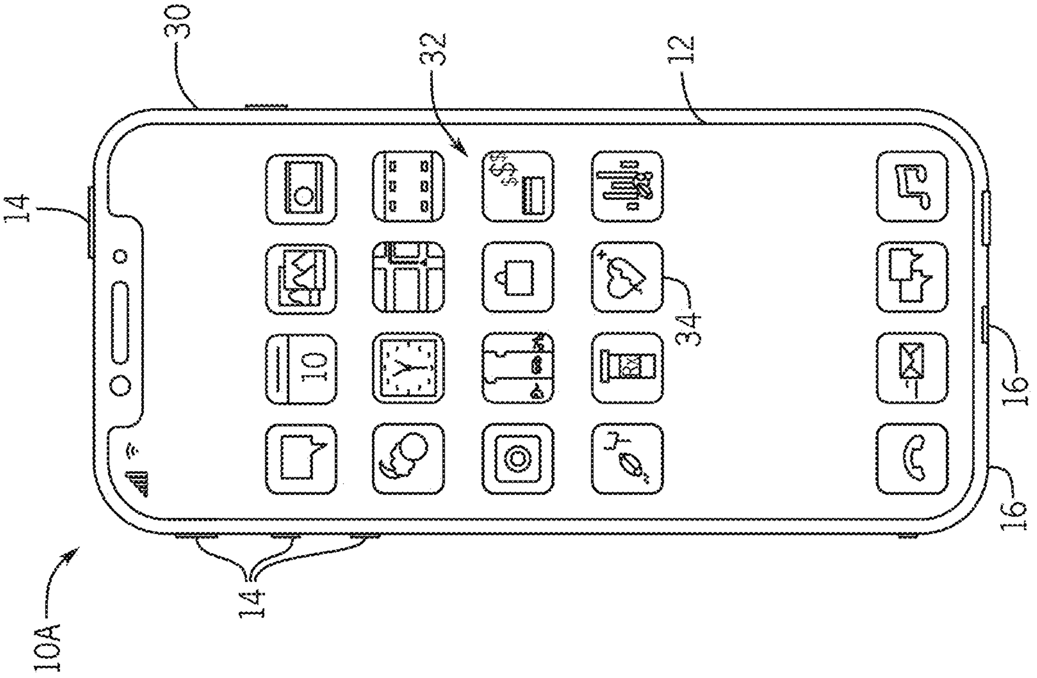
FIG. 2 is a front view of a handheld device representing another embodiment of the electronic device of FIG. 1.

The electronic device 10 may be any suitable electronic device. To help illustrate, an example of the electronic device 10, a handheld device 10A, is shown in FIG. 2. The handheld device 10A may be a portable phone, a media player, a personal data organizer, a handheld game platform, or the like. For illustrative purposes, the handheld device 10A may be a smartphone, such as an IPHONE® model available from Apple Inc.

The handheld device 10A includes an enclosure 30 (e.g., housing). The enclosure 30 may protect interior components from physical damage or shield them from electromagnetic interference, such as by surrounding the electronic display 12. The electronic display 12 may display a graphical user interface (GUI) 32 having an array of icons. When an icon 34 is selected either by an input device 14 or a touch-sensing component of the electronic display 12, an application program may launch.

The input devices 14 may be accessed through openings in the enclosure 30. The input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, or toggle between vibrate and ring modes.

Figure 3:
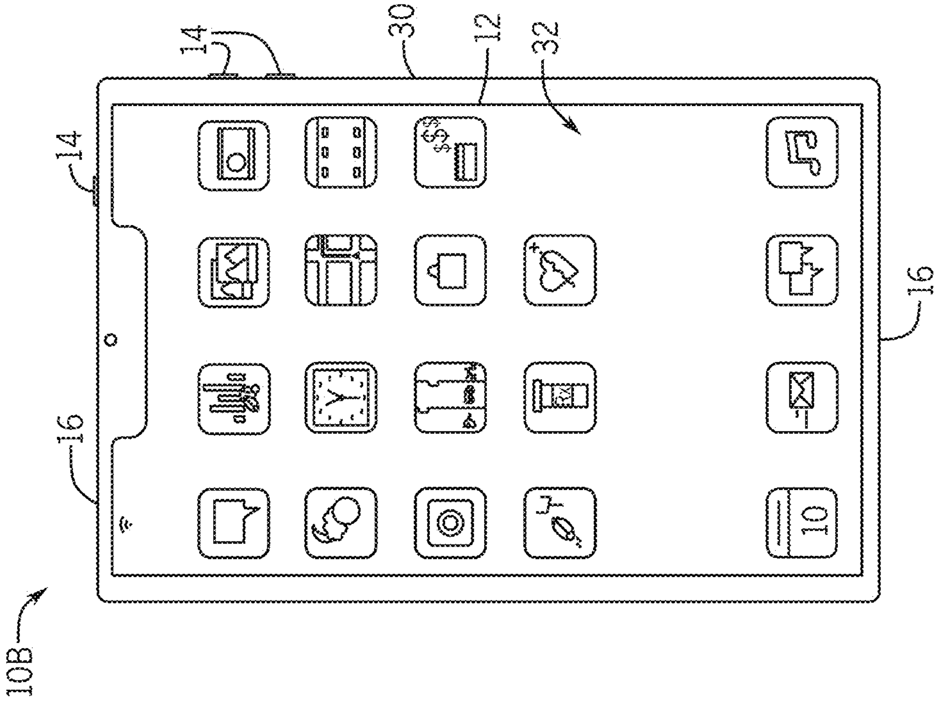
FIG. 3 is a front view of another handheld device representing another embodiment of the electronic device of FIG. 1.
Figure 4:
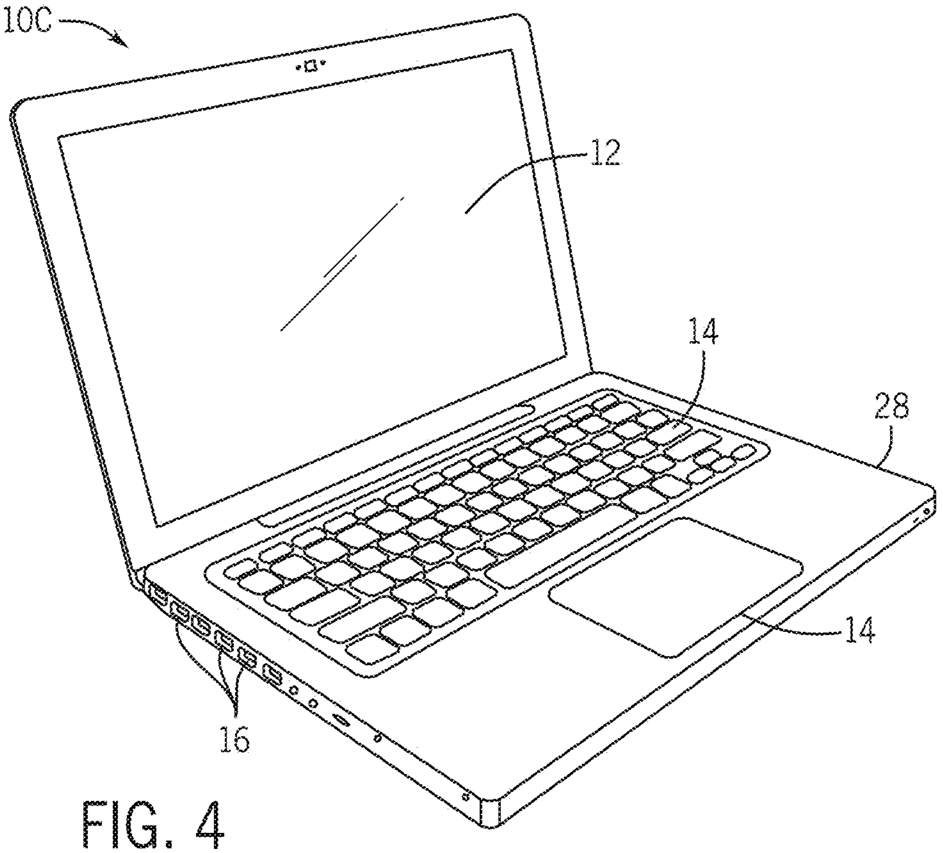
FIG. 4 is a perspective view of a notebook computer representing an embodiment of the electronic device of FIG. 1.
Figure 5:
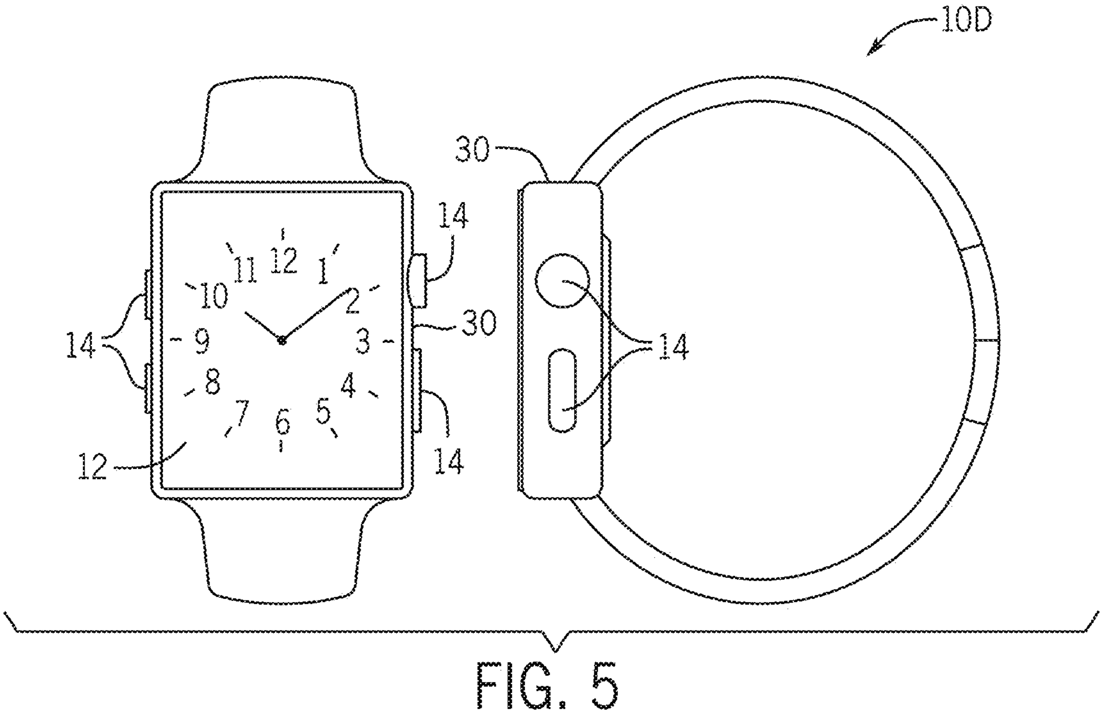
FIG. 5 is a front view and side view of a wearable electronic device representing another embodiment of the electronic device of FIG. 1.

Another example of a suitable electronic device 10, specifically a tablet device 10B, is shown in FIG. 3. The tablet device 10B may be any IPAD® model available from Apple Inc. A further example of a suitable electronic device 10, specifically a computer 10C, is shown in FIG. 4. For illustrative purposes, the computer 10C may be any MACBOOK® or IMAC® model available from Apple Inc. Another example of a suitable electronic device 10, specifically a watch 10D, is shown in FIG. 5. For illustrative purposes, the watch 10D may be any APPLE WATCH® model available from Apple Inc. As depicted, the tablet device 10B, the computer 10C, and the watch 10D each also includes an electronic display 12, input devices 14, I/O ports 16, and an enclosure 30. The electronic display 12 may display a GUI 32. Here, the GUI 32 shows a visualization of a clock. When the visualization is selected either by the input device 14 or a touch-sensing component of the electronic display 12, an application program may launch, such as to transition the GUI 32 to presenting the icons 34 discussed in FIGS. 2 and 3.

Figure 6:
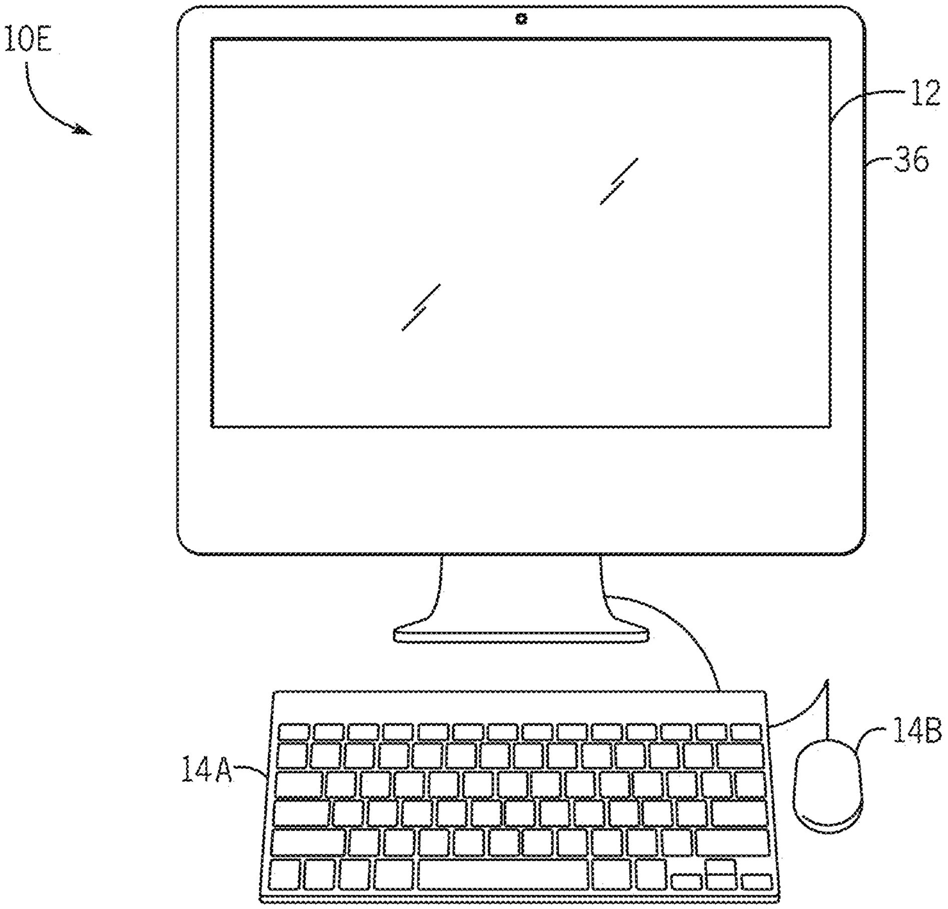
FIG. 6 is a front view of a desktop computer representing another embodiment of the electronic device of FIG. 1.

Turning to FIG. 6, a computer 10E may represent another embodiment of the electronic device 10 of FIG. 1. The computer 10E may be any suitable computer, such as a desktop computer, a server, or a notebook computer, but may also be a standalone media player or video gaming machine. By way of example, the computer 10E may be an iMac®, a MacBook®, or other similar device by Apple Inc. of Cupertino, California. It should be noted that the computer 10E may also represent a personal computer (PC) by another manufacturer. A similar enclosure 36 may be provided to protect and enclose internal components of the computer 10E, such as the electronic display 12. In certain embodiments, a user of the computer 10E may interact with the computer 10E using various peripheral input structures (e.g., input devices 14), such as the keyboard 14A or mouse 14B, which may connect to the computer 10E.

Figure 7:
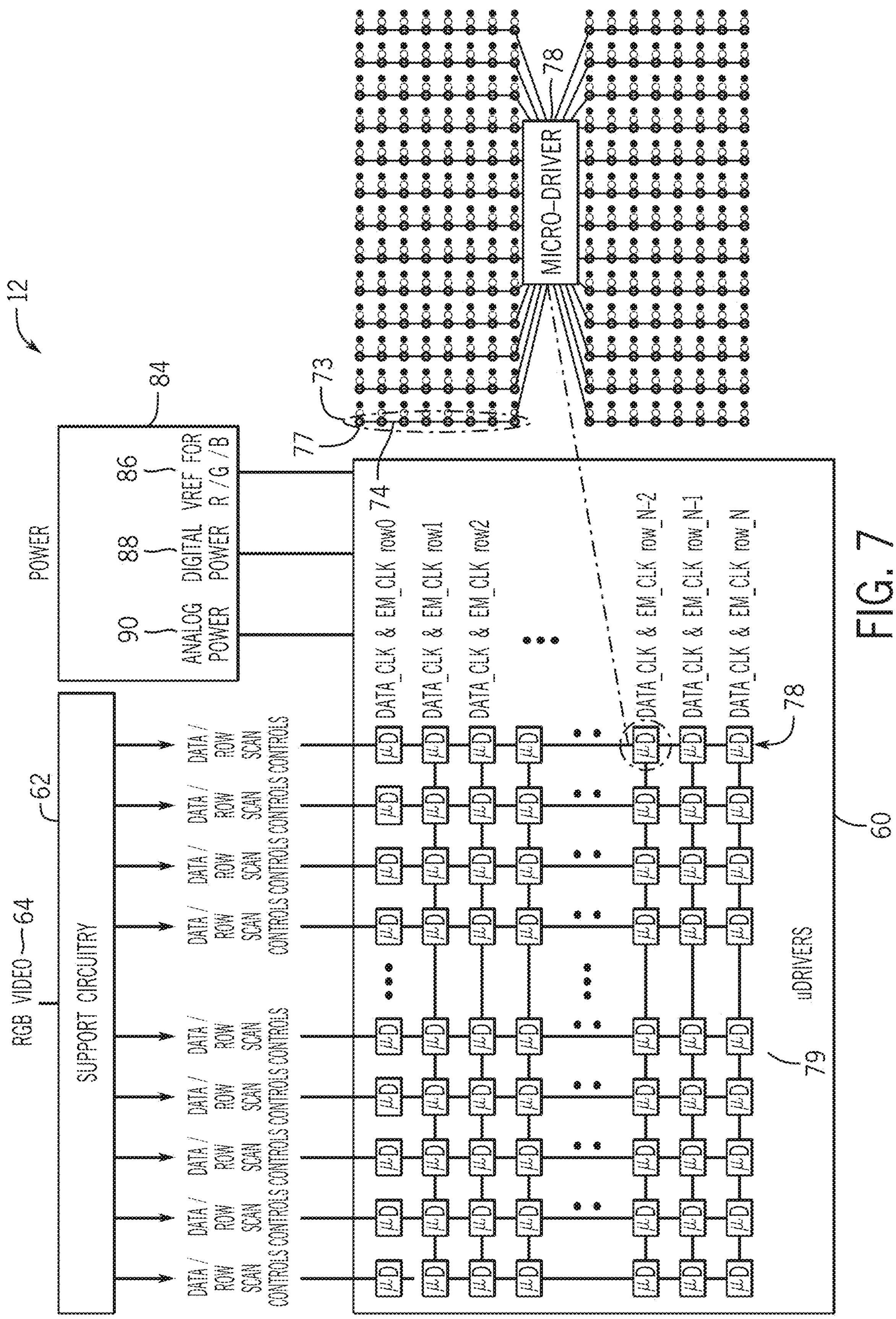
FIG. 7 is a block diagram of a micro-LED display that employs micro-drivers to drive display pixels with controls signals, in accordance with an embodiment.

FIG. 7 depicts a block diagram of an example architecture of the electronic display 12 (e.g., micro-LED display 12). In the example of FIG. 7, the micro-LED display 12 uses an RGB display panel 60 with pixels that include red, green, and blue micro-LEDs as display pixels. Support circuitry 62 may receive RGB-format video image data 64. It should be appreciated, however, that the micro-LED display 12 may display other formats of image data, in which case the support circuitry 62 may receive image data of such different image format. In some embodiments, the support circuitry 62 may include a video timing controller (video TCON) and/or emission timing controller (emission TCON) that receives and uses the image data 64 in a serial bus to determine a data clock signal (DATA_CLK) and/or a emission clock signal (EM_CLK) to control the provision of the image data 64 in the micro-LED display 12. The video TCON may also pass the image data 64 to a serial-to-parallel circuitry that may deserialize the image data 64 signal into several parallel image data signals. That is, the serial-to-parallel circuitry may collect the image data 64 into the particular data signals that are passed on to specific columns among a total of M respective columns in the display panel 60. As noted above, the video TCON may generate the data clock signal (DATA_CLK), and the emission TCON may generate the emission clock signal (EM_CLK). Collectively, these may be referred to as Data/Row Scan Control signals, as illustrated in FIG. 7. As such, the data is labeled DATA/ROW SCAN CONTROLS. The data/row scan controls respectively contain image data corresponding to pixels in the first column, second column, third column, fourth column . . . fourth-to-last column, third-to-last column, second-to-last column, and last column, respectively. The data/row scan controls may be collected into more or fewer columns depending on the number of columns that make up the display panel 60.

In particular, the display panel 60 columns include micro-drivers 78. The micro-drivers 78 are arranged in an array 79. The micro-drivers 78 may receive and/or pass on various signals sent from the support circuitry 62. By way of example, micro-drivers 78 on the left-hand side of the display may receive row scan control signals and pass those signals that correspond to its particular row to other micro-drivers 78 in that row of micro-drivers. Each micro-driver 78 drives a number of display pixels 77. Different display pixels (e.g., display sub-pixel) 77 may include different colored micro-LEDs (e.g., a red micro-LED, a green micro-LED, or a blue micro-LED) to represent the image data 64 in RGB format. Although one of the micro-drivers 78 of FIG. 7 is shown to drive twenty-six anodes 73 having eight display pixels 77 each, each micro-driver 78 may drive more or fewer anodes 73 (e.g., 8 anodes, 9 anodes, 10 anodes, 11 anodes, 12 anodes, 14 anodes, 15 anodes, 16 anodes, 17 anodes, 18 anodes, and so forth) and respective display pixels 77. As illustrated, the subset of display pixels 77 located on each anode 73 may be associated with a particular color (e.g., red, green, or blue). As mentioned above, it should be noted that a respective cathode corresponds to a subset of display pixels 77 associated with a particular color even though each cathode for a particular color channel is not illustrated in FIG. 7. For example, cathode corresponds to a red color channel (e.g., subset of red display pixels 77). There may be a second set of cathodes that couple to a green color channel (e.g., subset of green display pixels 77) and a third set of cathodes that couple to a blue color channel (subset of blue display pixels 77), but these are not expressly illustrated in FIG. 7 for ease of illustration.

A power supply 84 may provide a reference voltage (VREF) 86 to drive the micro-LEDs, a digital power signal 88, and an analog power signal 90. In some cases, the power supply 84 may provide more than one reference voltage (VREF) 86 signal. Namely, display pixels 77 of different colors may be driven using different reference voltages. As such, the power supply 84 may provide more than one reference voltage (VREF) 86. Additionally or alternatively, other circuitry on the display panel 60 may step the reference voltage (VREF) 86 up or down to obtain different reference voltages to drive different colors of micro-LED.

Figure 8:
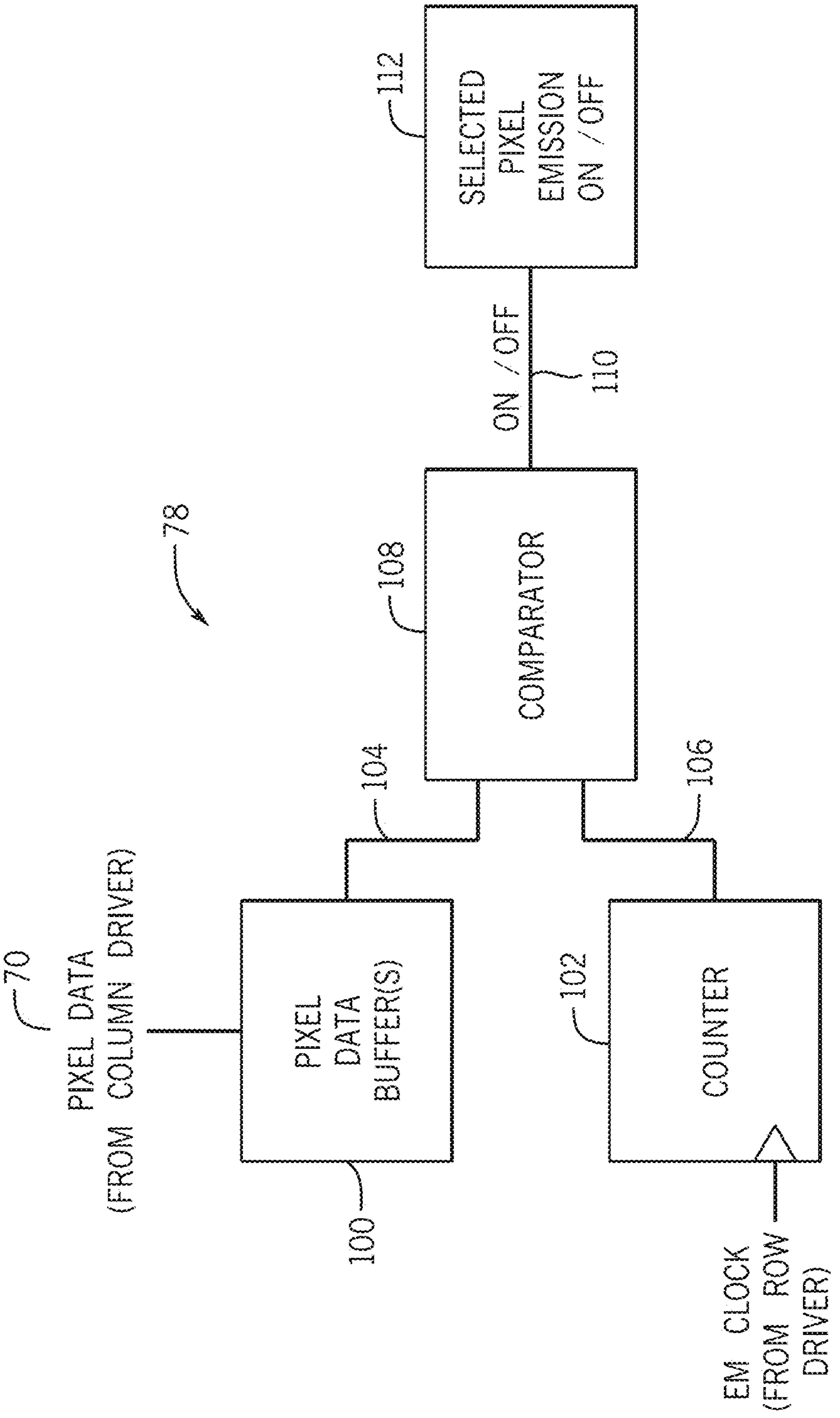
FIG. 8 is a block diagram schematically illustrating an operation of a micro-driver of FIG. 7, in accordance with an embodiment of the present disclosure.

A block diagram shown in FIG. 8 illustrates some of the components of one of the micro-drivers 78. The micro-driver 78 shown in FIG. 6 includes pixel data buffer(s) 100 and a digital counter 102. The pixel data buffer(s) 100 may include sufficient storage to hold image data 70 that is provided (e.g., as a digital code 70). For instance, the micro-driver 78 may include pixel data buffers to store image data 70 for a display pixel 77 at any one time (e.g., for 8-bit image data 70, this may be 24 bits of storage). It should be appreciated, however, that the micro-driver 78 may include more or fewer buffers, depending on the data rate of the image data 70 and the number of display pixels 77 included in the image data 70. The pixel data buffer(s) 100 may take any suitable logical structure based on the order that the column driver provides the image data 70. For example, the pixel data buffer(s) 100 may include a first-in-first-out (FIFO) logical structure or a last-in-first-out (LIFO) structure.

When the pixel data buffer(s) 100 has received and stored the image data 70, the micro-driver 78 may provide the emission clock signal (EM_CLK). A digital counter 102 may receive the emission clock signal (EM_CLK) as an input. The pixel data buffer(s) 100 may output enough of the stored image data 70 to output a digital data signal 104 represent a desired gray level for a particular display pixel 77 that is to be driven by the micro-driver 78. The digital counter 102 may also output a digital counter signal 106 indicative of the number of edges (only rising, only falling, or both rising and falling edges) of the emission clock signal (EM_CLK) 98. The signals 104 and 106 may enter a comparator 108 that outputs an emission control signal 110 in an "on" state when the signal 106 does not exceed the data signal 104, and an "off" state otherwise. The emission control signal 110 may be routed to driving circuitry (not shown) for the display pixel 77 being driven, which may cause light emission 112 from the selected display pixel 77 to be on or off. The longer the selected display pixel 77 is driven "on" by the emission control signal 110, the greater the amount of light that will be perceived by the human eye as originating from the display pixel 77.

Figure 9:
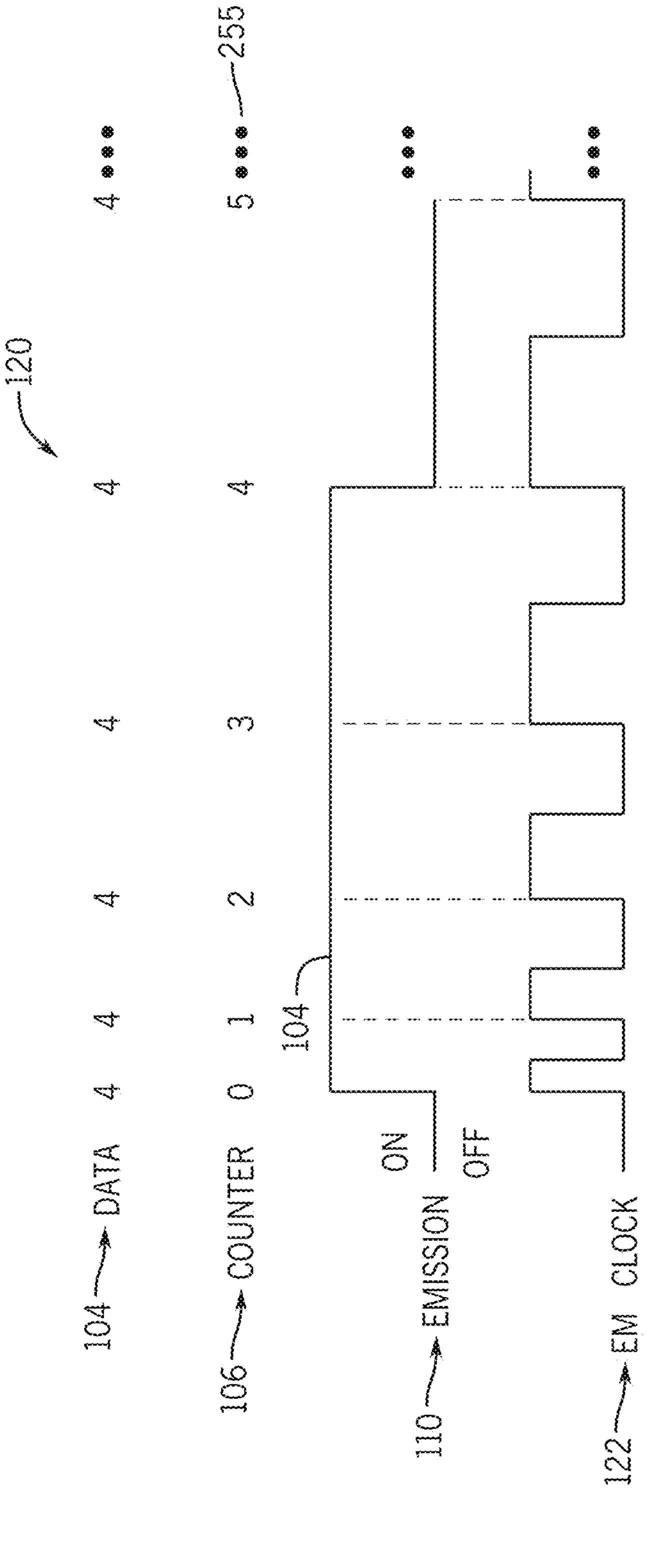
FIG. 9 is a timing diagram illustrating an example operation of the micro-driver of FIG. 8, in accordance with an embodiment of the present disclosure.

A timing diagram 120, shown in FIG. 9, provides one brief example of the operation of the micro-driver 78. The timing diagram 120 shows the digital data signal 104, the digital counter signal 106, the emission control signal 110, and the emission clock signal (EM_CLK) represented by numeral 122. In the example of FIG. 9, the gray level for driving the selected display pixel 77 is gray level 4, and this is reflected in the digital data signal 104. The emission control signal 110 drives the display pixel 77 "on" for a period of time defined as gray level 4 based on the emission clock signal (EM_CLK). Namely, as the emission clock signal (EM_CLK) rises and falls, the digital counter signal 106 gradually increases. The comparator 108 outputs the emission control signal 110 to an "on" state as long as the digital counter signal 106 remains less than the data signal 104. When the digital counter signal 106 reaches the data signal 104, the comparator 108 outputs the emission control signal 110 to an "off" state, thereby causing the selected display pixel 77 no longer to emit light.

It should be noted that the steps between gray levels are reflected by the steps between emission clock signal (EM_CLK) edges. That is, based on the way humans perceive light, to notice the difference between lower gray levels, the difference between the amounts of light emitted between two lower gray levels may be relatively small. To notice the difference between higher gray levels, however, the difference between the amounts of light emitted between two higher gray levels may be comparatively much greater. The emission clock signal (EM_CLK) therefore may use relatively short time intervals between clock edges at first. To account for the increase in the difference between light emitted as gray levels increase, the differences between edges (e.g., periods) of the emission clock signal (EM_CLK) may gradually lengthen. The particular pattern of the emission clock signal (EM_CLK), as generated by the emission TCON, may have increasingly longer differences between edges (e.g., periods) so as to provide a gamma encoding of the gray level of the display pixel 77 being driven.

Figure 10:
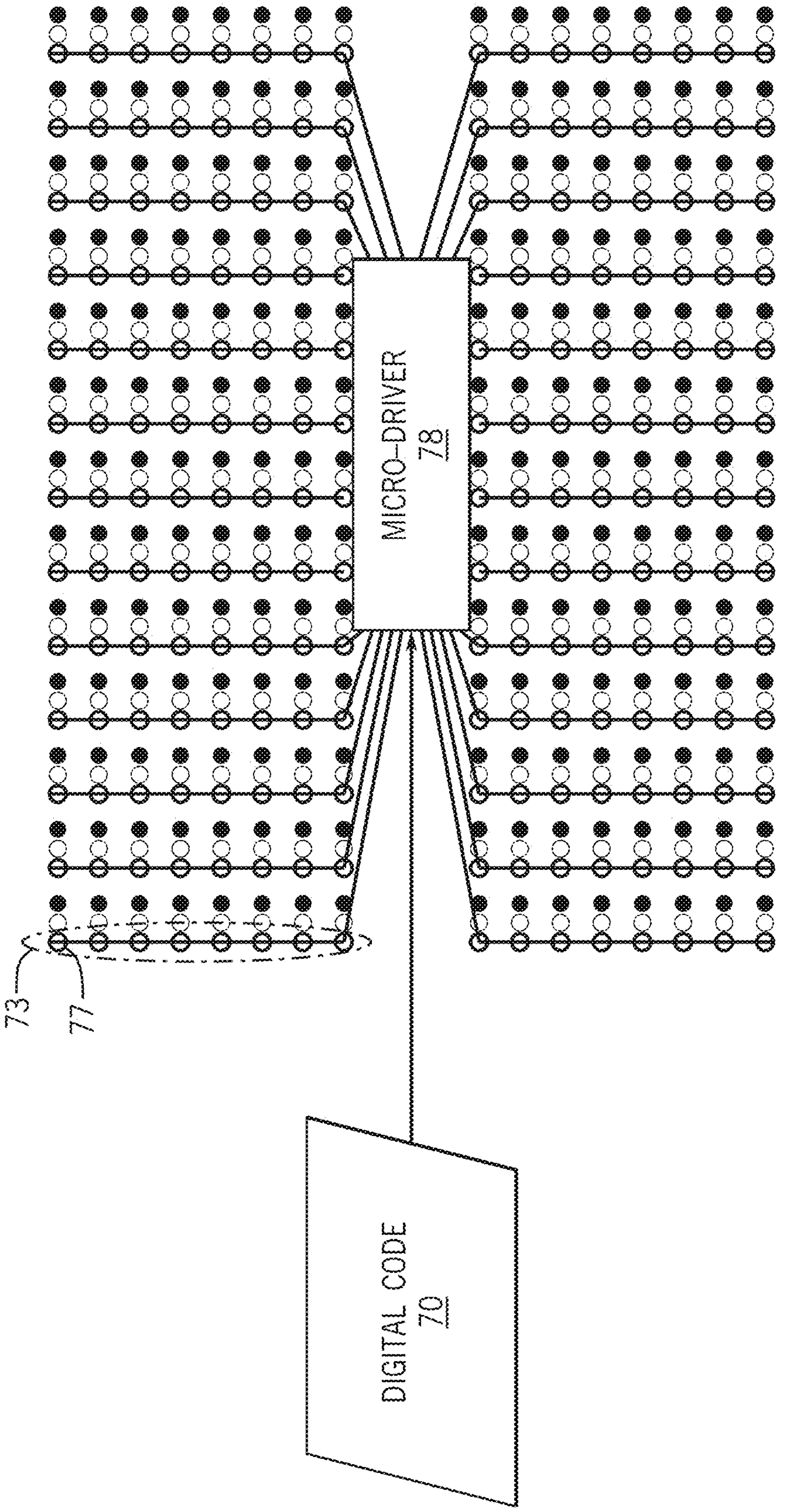
FIG. 10 is a schematic illustration of the micro-LED display of FIG. 7, where a micro-driver controls a collection of display pixels based on a digital code, in accordance with an embodiment of the present disclosure.

With the preceding in mind, FIG. 10 illustrates the micro-driver 78 driving the display pixels 77 according to the image data 70 in the form of a digital code, and thereby enabling image content to be displayed by the micro-LED display 12. As mentioned above, the micro-driver 78 may drive any suitable number of display pixels 77, and a subset of display pixels 77 may be located on respective anodes 73 of the micro-LED display 12. As illustrated, the subset of display pixels 77 located on each anode 73 may be associated with a particular color (e.g., red, green, blue). Further, it should be noted that a respective cathode corresponds to a subset of display pixels 77 associated with a particular color even though each cathode for a particular color channel is not illustrated in FIG. 10. For example, as illustrated, a first set of cathodes corresponds to a red color channel (e.g., subset of red display pixels 77). However, there may be a second set of cathodes that couple to a green color channel (e.g., subset of green display pixels 77) and a third set of cathodes that couple to a blue color channel (subset of blue display pixels 77). The second set of cathodes and the third set of cathodes are not expressly illustrated in FIG. 10 for ease of illustration.

Figure 11:
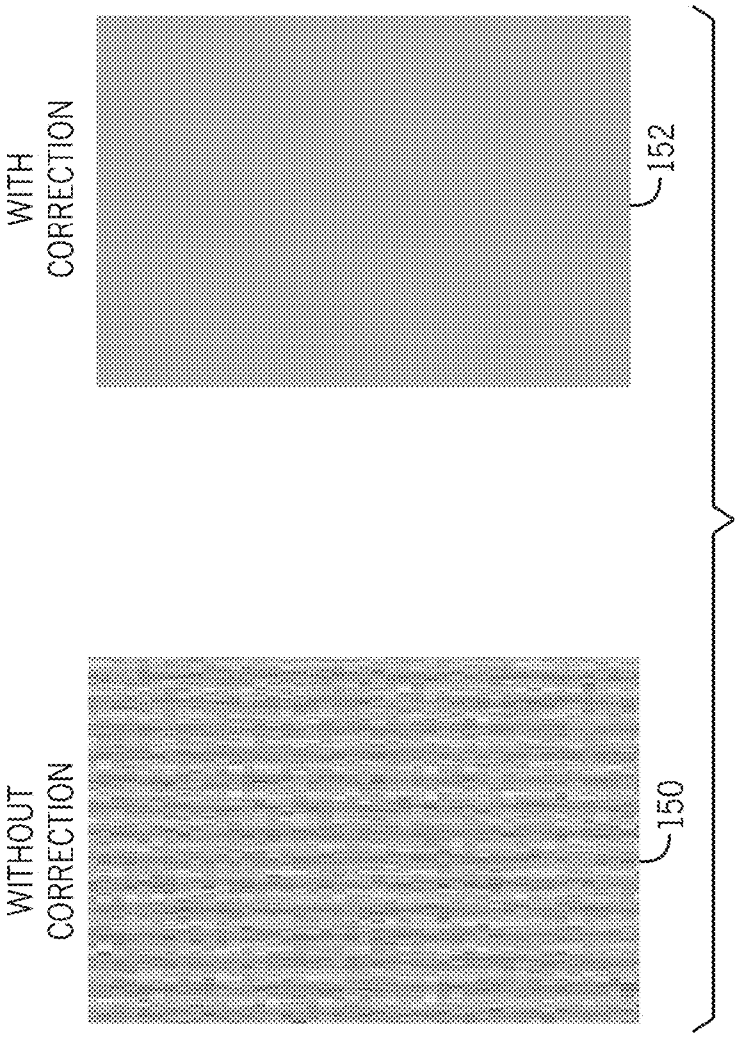
FIG. 11 is a schematic illustration depicting an image artifact that is less visible on the micro-LED display of FIG. 7 after display pixel non-uniformity compensation, in accordance with an embodiment of the present disclosure.

In some cases, the image content displayed by the micro-LED display may include image artifacts such as repeating or random vertical lines due to display pixel non-uniformity. Display pixel non-uniformity may stem from display pixel current mismatch, issues in display pixel efficiency, imbalance in anode capacitance, imbalance in display pixel capacitance, imbalance in spline capacitance (e.g., capacitance at spline borders), and so forth. Such display pixel non-uniformity may be corrected as depicted in FIG. 11. Without display pixel non-uniformity compensation, image artifacts due to display pixel non-uniformity such as repeating vertical lines appear could appear when image content 150 is displayed on the micro-LED display 12. However, after display pixel non-uniformity correction, the repeating vertical lines are fully invisible or partially invisible as depicted by image content 152. After compensating for display pixel non-uniformity, the visibility of the image may be reduced by 50%, 80%, 90%, 100%, and the like. The process for display pixel non-uniformity will be described in greater detail below.

Figure 12A:
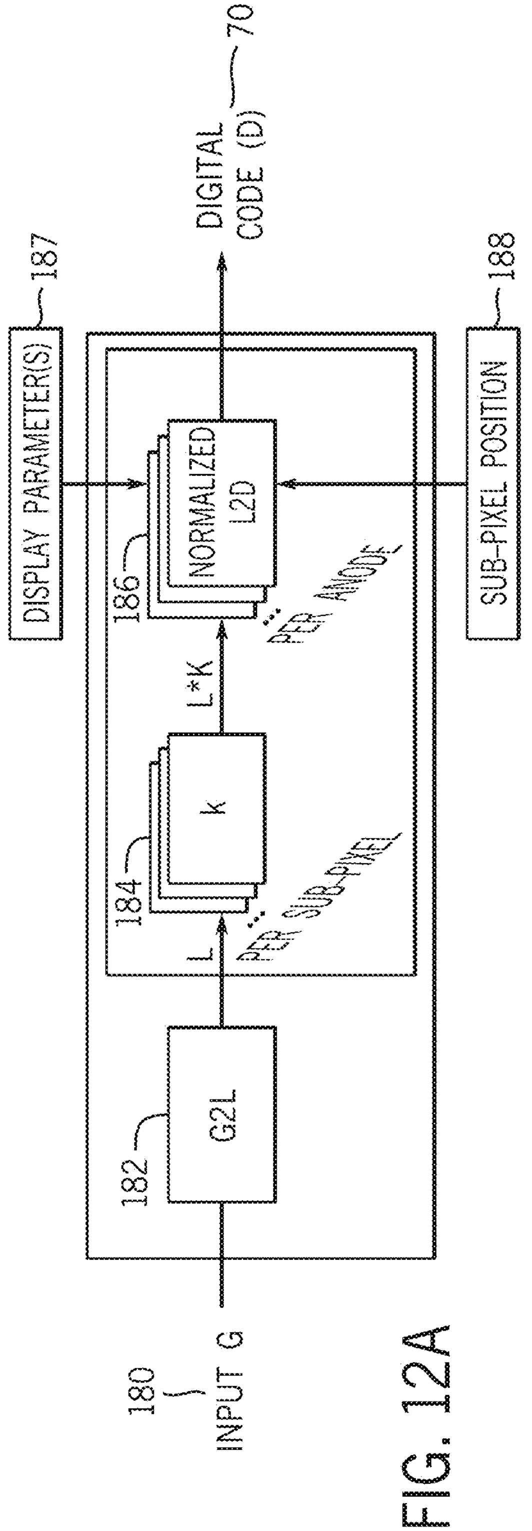
FIG. 12A is a block diagram associated with correcting display pixel non-uniformity according to a per-pixel gain mask, in accordance with an embodiment of the present disclosure.

FIG. 12A is a block diagram associated with correcting display pixel non-uniformity according to a per-pixel gain mask, in accordance with an embodiment of the present disclosure. Processing circuitry of the micro-LED display 12 or the processing circuitry of the electronic device 10 associated with the micro-LED display 12 may perform display pixel non-uniformity compensation to reduce image artifacts when image content is displayed. The processing circuitry may receive image data corresponding to a display pixel 77 in a gray level 180. To perform display pixel non-uniformity, the processing circuitry may convert the gray level 180 of the image data into a luminance value in the luminance domain using a gray level to luminance domain curve 182. To partially correct for the display pixel non-uniformity, the processing circuitry may adjust the luminance value of the display pixel 77 according to a per-pixel gain mask 184. Although this has been described as a per-pixel adjustment, the adjustment may additionally or alternatively include applying a gain to a group of display pixels 77, a region of display pixels 77, a set of display pixels 77 driven drive by the same micro-driver 78, a set of display pixels 77 on the same anode 73, a set of display pixels 77 of the same color, or a set of display pixels in the same position around the micro-driver 78, to provide just a few examples. Applying a gain (e.g., a per-pixel gain) to image data associated with the display pixel 77 in the luminance domain may help correct for non-uniformity resulting from imbalances in display pixel capacitance. In some embodiments, the per-pixel gain may be a scalar value.

To further correct for display pixel non-uniformity due to anode nonuniformities, the processing circuitry may convert the luminance value in the luminance domain to a digital code 70 based on a curve 186 (e.g., luminance domain to digital code (L2D) curve 186) associated with an anode on which the display pixel 77 is located. The curve may be determined using binning techniques (e.g., curve binning, parametric binning, spatial binning) based on display parameters 187 associated with the display pixel 77 and a position 188 of the display pixel 77 on the micro-LED display 12. Display parameters 187 may include temperature, brightness, current frequency, and panel physics associated with the display pixel 77. In some embodiments, the luminance domain to digital code curve 186 may be determined based on a single display parameter 187, a group of display parameters 187, and/or a position 188 of the display pixel 77. For example, display parameters 187 and/or a position of a first display pixel 77 located on a first anode may be similar to those of other display pixels 77 located on a second anode. Thus, the same curve 186 may be used for the first display pixel 77 and the other display pixels 77. Converting to the digital code 70 using the curve 186 associated with the anode on which the display pixel 77 is located may help mitigate capacitance imbalance associated with the anode, thereby further reducing the display pixel non-uniformity.

Figure 12B:
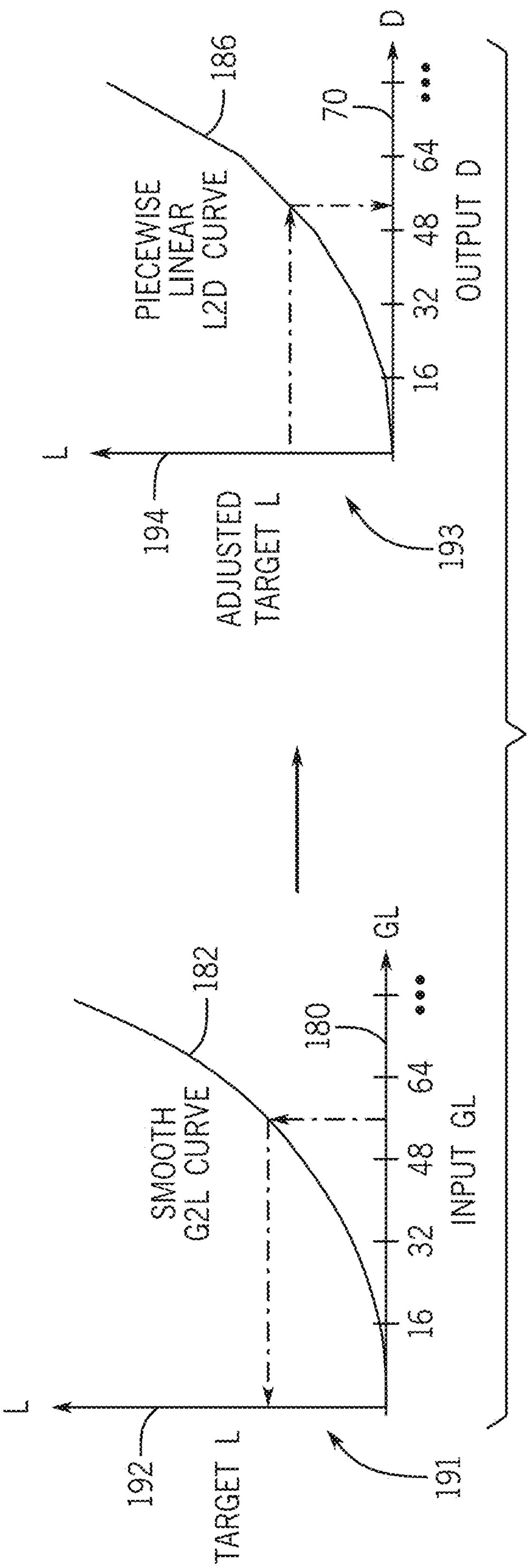
FIG. 12B depicts a first graph representative of a gray level to luminance domain curve and a second graph representative of a luminance domain to a digital code curve, in accordance with an embodiment of the present disclosure.

With the preceding in mind, FIG. 12B depicts a graph 191 portraying the relationship between a gray level 180 of the image data corresponding to the display pixel 77 and a luminance 192 of the image data prior to display pixel non-uniformity compensation. Converting from the gray level 180 into a luminance domain 192 is associated with a smooth gray level to luminance domain curve 186. Performing display pixel non-uniformity compensation is based on the luminance to digital code curve 186. In some embodiments, the luminance to digital code curve 186 may be stored as a piecewise, linear curve in memory (e.g., lookup table). Storing the luminance to digital code curve 186 as a piecewise, linear curve in memory may serve as a compact way of storing the luminance to digital code curve 186 and reduce the size of the lookup table as opposed to storing multiple equations that would be calculated to represent the luminance to digital code curve 186. As such, FIG. 12B also depicts a graph 193 portraying the relationship between an adjusted luminance 194 and the digital code 70 based on performing the display pixel non-uniformity compensation.

Figure 13:
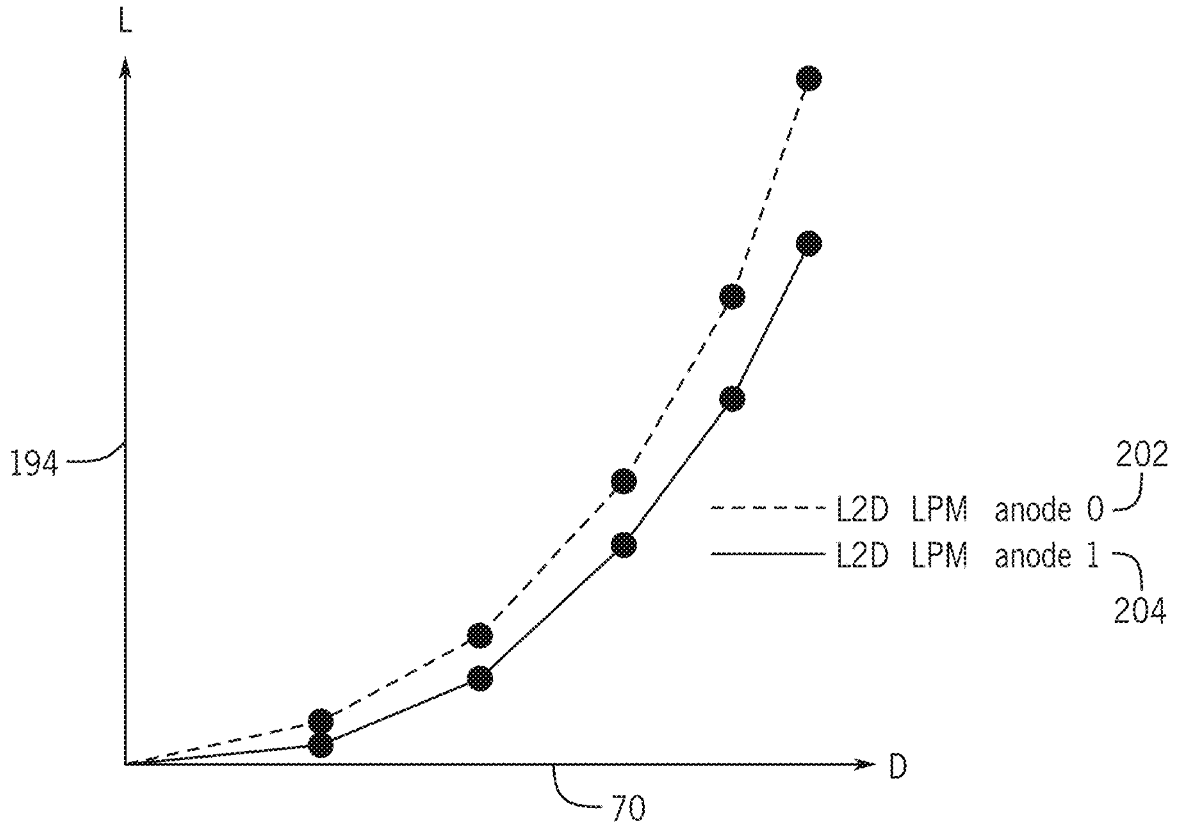
FIG. 13 is a graph depicting luminance domain to digital code curves for respective anodes of the micro-LED display of FIG. 7, in accordance with an embodiment of the present disclosure.

As mentioned above, each anode may be represented by a luminance to digital code curve. As such, FIG. 13 is a graph depicting the relationship between the digital code 70 and the luminance domain 194 for different anodes of the micro-LED display 12, in accordance with an embodiment of the present disclosure. As illustrated, two different anodes 73 (here represented as anode 202 and anode 204) may be associated with different luminance to digital code curves. In other embodiments, both anodes 202 and 204 may be sufficiently alike so as to share the same luminance to digital code curve. In that case, storing a fewer number of curves compared to the number of anodes associated with the micro-LED display 12 may be more efficient when compensating for non-uniformity and reduce cost when manufacturing the micro-LED display 12. In this way, there may be fewer luminance to digital code curve 186 than there are anodes of the micro-LED display 12.

Figure 14:
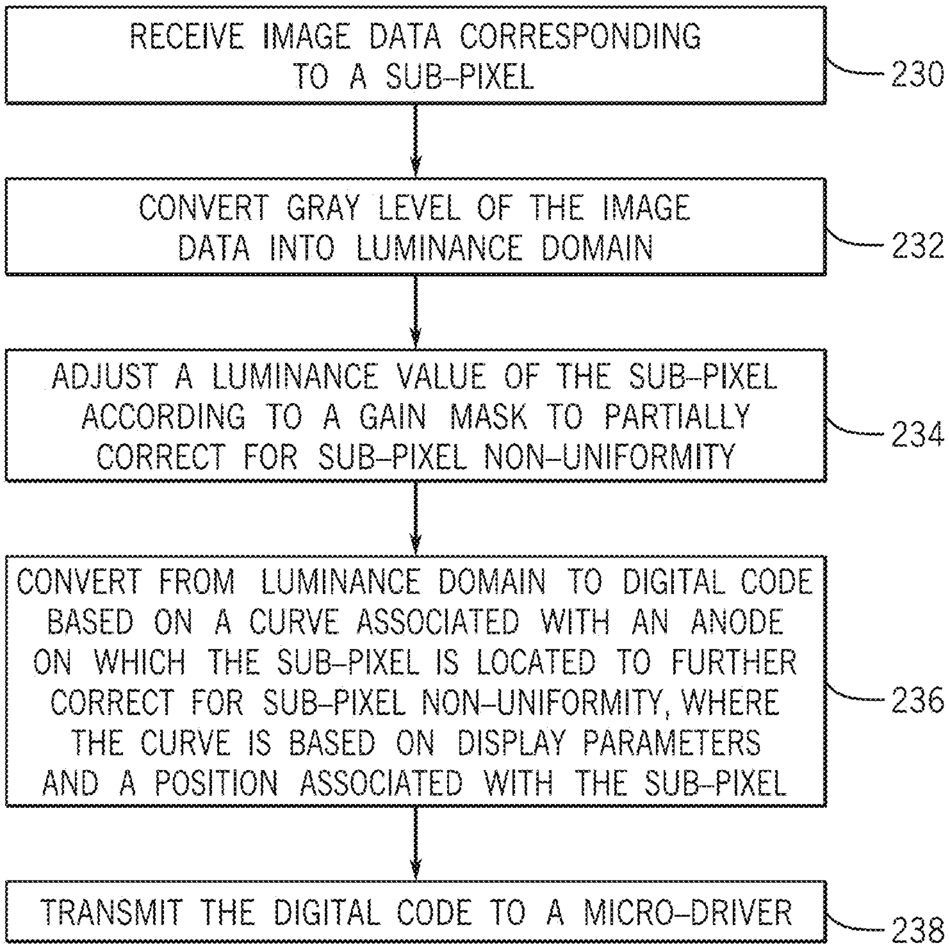
FIG. 14 is a flow diagram associated with correcting display pixel non-uniformity according to a per-pixel gain mask, in accordance with an embodiment of the present disclosure.

FIG. 14 is a flow diagram that provides a more in-depth discussion of correcting display pixel non-uniformity according to a per-pixel gain mask. While the process of FIG. 14 is described using process blocks in a specific sequence, it should be understood that the present disclosure contemplates that the described process blocks may be performed in different sequences than the sequence illustrated, and certain described process blocks may be skipped or not performed altogether. At block 230, processing circuitry (e.g., the processor core complex, image processing circuitry, image compensation circuitry) receives image data corresponding to a display pixel.

In some embodiments, when the processing circuitry receives the image data associated with an image from an image source, the image data may be defined as a gray level. As such, at block 232, to perform display pixel non-uniformity compensation, the processing circuitry converts the gray level of the image data into a luminance value in the luminance domain.

At block 234, the processing circuitry performs a first non-uniformity correction by adjusting a luminance value of the display pixel according to a gain mask. By applying a per-pixel gain mask to the image data corresponding to the display pixel, the processing circuitry partially corrects for display pixel non-uniformity that may have resulted from the capacitance associated with the display pixel.

At block 236, the processing circuitry performs a second non-uniformity correction by converting from the luminance value in the luminance domain to a digital code based on a curve associated with an anode on which the display pixel is located. The curve may be determined using binning techniques based on display parameters associated with the display pixel 77 and/or a position of the display pixel 77 on the micro-LED display 12. By performing the second non-uniformity correction, the processing circuitry further corrects for the display pixel non-uniformity that may have resulted from the capacitance associated with the anode, for example.

After performing the display pixel non-uniformity compensation described above, at block 238, the processing circuitry transmits the digital code to a micro-driver via a micro-LED display. In some embodiments, the digital code may be similar in scale relative to the gray scale of the image data. In other embodiments, the digital code may be different in scale relative to the gray scale of the image data. The micro-driver drives the display pixel according to digital code such that the image content is displayed with reduced or no image artifacts due to display pixel non-uniformity.

Figure 15:
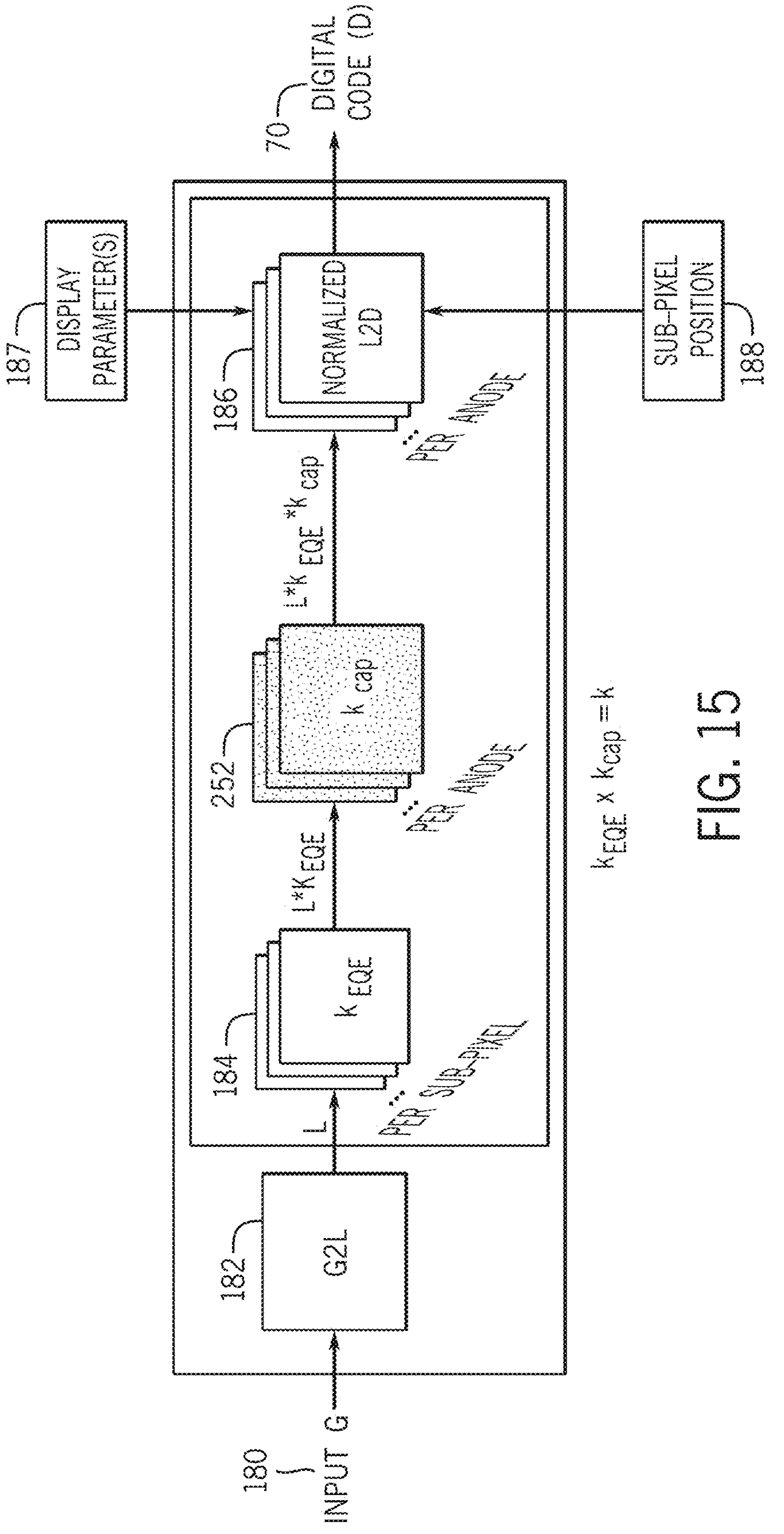
FIG. 15 is a block diagram associated with correcting display pixel non-uniformity according to a per-pixel gain mask and a per-anode gain mask, in accordance with an embodiment of the present disclosure.

In other embodiments, display pixel non-uniformity compensation may involve applying a per-pixel gain mask and a per-anode gain mask to image data corresponding to a display pixel. As such, FIG. 15 is a block diagram associated with correcting display pixel non-uniformity according to a per-pixel gain mask and a per-anode gain mask, in accordance with an embodiment of the present disclosure. Similar to the display pixel non-uniformity compensation described in FIG. 12A, the processing circuitry may convert a gray level 180 of image data into a luminance value in the luminance domain, thereby resulting in a gray level to luminance domain curve 182. To correct for the display pixel non-uniformity, processing circuitry may adjust a luminance of the display pixel 77 according to a per-pixel gain mask 184 and a separate per-anode gain mask 252 to account for the non-uniformity resulting from capacitances associated with the display pixel 77 and the anode on which the display pixel is located. As used herein, adjusting the luminance of the display pixel according to the per-anode gain mask 252 applying a per-pixel anode gain (e.g., a scalar gain value) to the display pixels 77 disposed on the anode 73 and/or the group of display pixels 77 disposed on the anode 73. In some cases, the per-anode gain mask 252 may be based on the position of the anode on which the display pixel is attached. For example, there may be some number of anodes per color per micro-driver (e.g., 8, 9, 10, 11, 12, 13, 14, 15, 16, 17, 18, or the like), and there may be a corresponding equivalent number of possible per-anode gain masks 252 that may be applied. In other examples, there may be hundreds of different anodes and there may be hundreds of different possible per-anode gain masks 252 that may be applied depending on which anode the current display pixel is attached to. To further correct for the display pixel non-uniformity, the processing circuitry may convert the luminance value to a digital code 70 based on a curve 186 (e.g., luminance domain to digital code curve 186) associated with an anode on which the display pixel 77 is located. The curve may be determined using binning techniques based on display parameters 187 associated with the display pixel 77 and/or a position 188 of the display pixel 77 on the micro-LED display 12.

Figure 16:
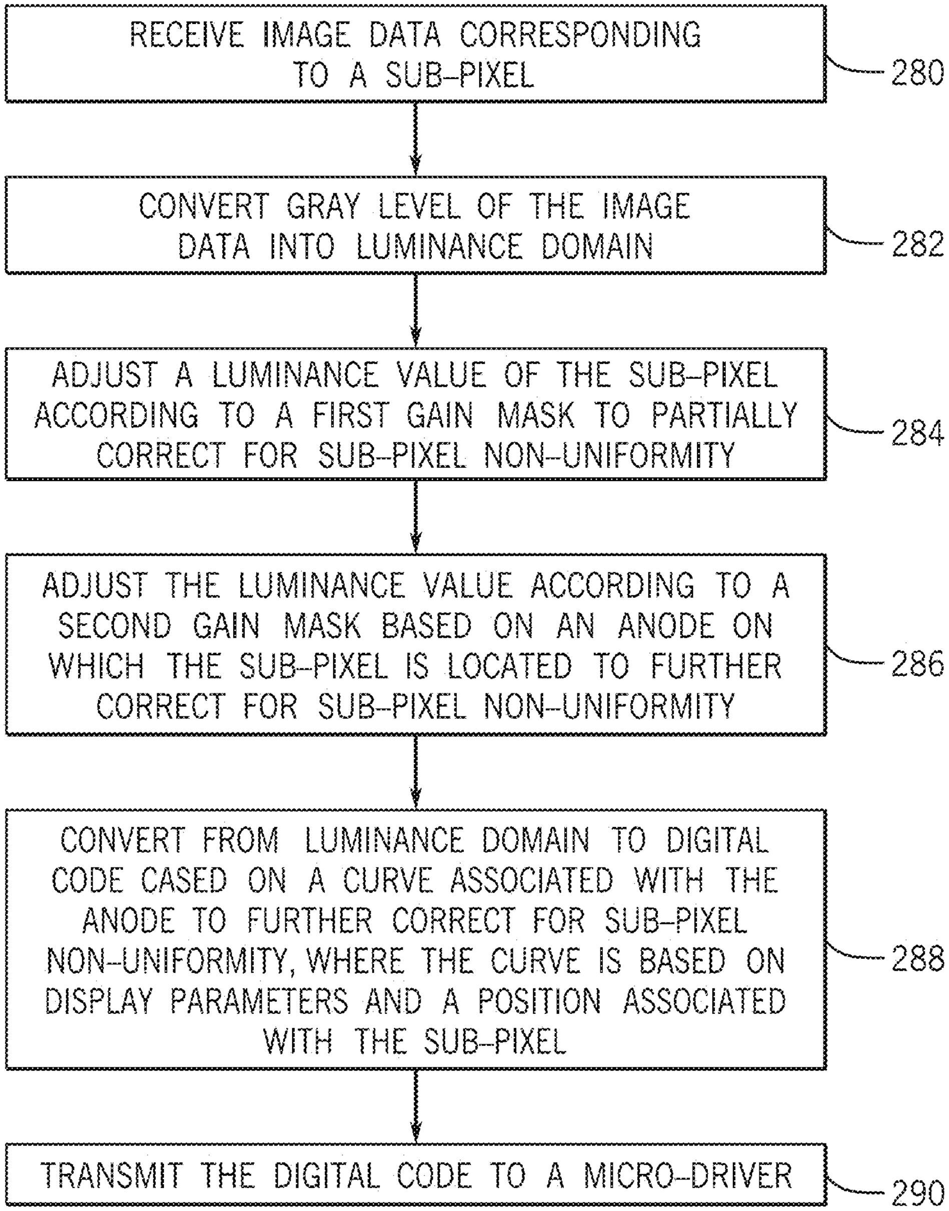
FIG. 16 is a flow diagram associated with correcting display pixel non-uniformity according to a per-pixel gain mask and a per-anode gain mask, in accordance with an embodiment of the present disclosure.

FIG. 16 is a flow diagram associated with correcting display pixel non-uniformity according to a per-pixel gain mask and a per-anode gain mask. While the process of FIG. 16 is described using process blocks in a specific sequence, it should be understood that the present disclosure contemplates that the described process blocks may be performed in different sequences than the sequence illustrated, and certain described process blocks may be skipped or may not be performed altogether. In the process of FIG. 16, blocks 280, 282, 284, 288, and 290 are similar to those described in blocks 230, 232, 234, 236, and 238 of FIG. 14, respectively. Unlike the process of FIG. 14, in addition to adjusting the luminance of the display pixel according to a per-pixel gain mask, the process of FIG. 16 involves block 286. At block 286, the processing circuitry adjusts the luminance of the display pixel according to a gain mask on the anode on which the display pixel is located to further correct for display pixel non-uniformity. It should be noted that the processes of FIGS. 14 and 16 are both examples for performing non-uniformity compensation.

Figure 17:
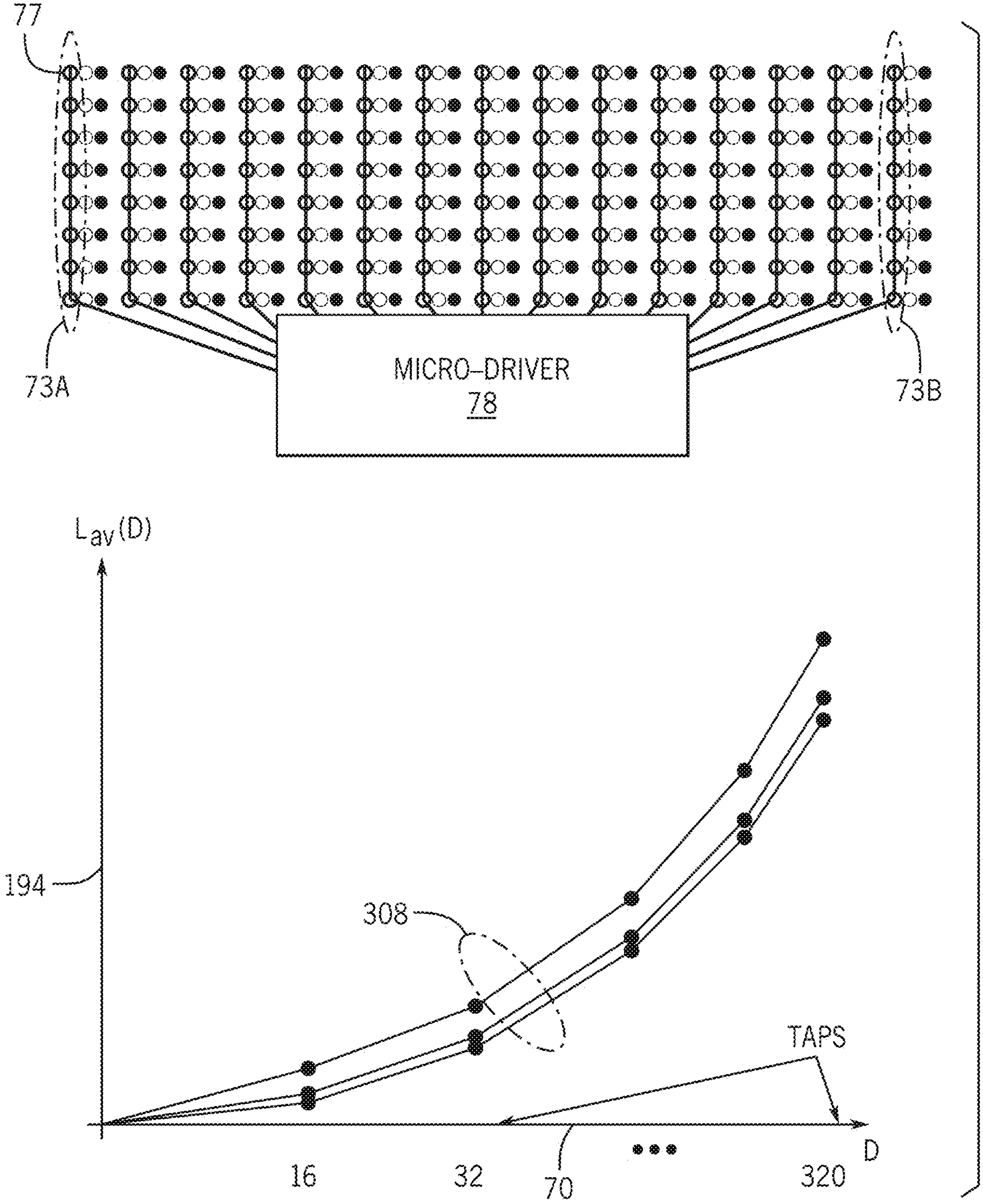
FIG. 17 is a graph depicting a shared curve to convert luminance domain to a digital code for at least two anodes of the micro-LED display of FIG. 7, in accordance with an embodiment of the present disclosure.

As mentioned above, in some embodiments, fewer luminance to digital code curves may be stored relative to the number of anodes 73 of the micro-LED display 12. That is, two or more anodes may share the same per-anode gain (e.g., gain value) and/or luminance to digital code (L2D) curve. As such, FIG. 17 is a luminance 194 to digital code 70 (e.g., the image data 70 described with respect to FIGS. 8 and 10) graph depicting a shared luminance domain to a digital code curve 308 between two different anodes (e.g., anode 73A and 73B) of the micro-LED display 12. During manufacturing of the micro-LED display, calibration circuitry (e.g., separate from the processing circuitry) may identify the luminance to digital code curve associated with an anode using a lookup table and techniques such as spatial binning, curve binning, or parametric binning. The shared luminance domain to a digital code curve illustrated in FIG. 17 is determined based on curve binning. For example, even though anodes 73A and 73B are disposed on opposite sides of the micro-LED display 12, both may share the same luminance domain to a digital code curve based on having similar capacitance and other properties. Since curves may be shared between anodes, a fewer number of curves relative to the number of anodes may be stored. It can be appreciated that display pixel non-uniformity compensation may be performed for two or more display pixels using the same luminance domain to a digital code curve since respective anodes of the two or more display pixels may share the luminance domain to a digital code curve.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An electronic device, comprising:

an electronic display comprising a plurality of display pixels configured to display image content; and processing circuitry configured to:

receive image data corresponding to a display pixel of the plurality of display pixels;

convert a gray level of the image data into a luminance value of a luminance domain;

perform a first correction for non-uniformity associated with the display pixel by adjusting the luminance value of the display pixel according to one or more gain masks; and perform a second correction for the non-uniformity associated with the display pixel by converting the luminance value to a digital code based at least in part on a curve associated with an anode on which the display pixel is disposed.

2. The electronic device of claim 1, wherein the curve associated with the anode on which the display pixel is disposed is also associated with a second anode and is not associated with a third anode.

3. The electronic device of claim 1, wherein the one or more gain masks comprise a per-pixel gain mask, a per-anode gain mask, or both.

4. The electronic device of claim 1, wherein the processing circuitry is configured to receive the curve from memory comprising a lookup table, wherein the lookup table identifies the curve from among a plurality of curves associated with respective anodes on which respective display pixels of the plurality of display pixels are disposed.

5. The electronic device of claim 1, wherein the electronic display comprises a plurality of anodes, wherein a subset of the plurality of display pixels are disposed on an anode of the plurality of the anodes, and wherein a number of curves associated with the plurality of anodes is fewer than a total number of anodes.

6. The electronic device of claim 5, wherein the subset of the plurality of display pixels disposed on the anode comprises micro light-emitting diodes (micro-LEDs) of a single color.

7. The electronic device of claim 1, wherein the curve comprises a piecewise linear curve.

8. The electronic device of claim 1, wherein the electronic display comprises a light-emitting diode (LED) display, a micro light-emitting diode (micro-LED) display, or an organic light-emitting diode (OLED) display.

9. The electronic device of claim 1, wherein the curve is selected from among a plurality of curves based at least in part on one or more display parameters associated with the display pixel, a position of the display pixel, or both.

10. The electronic device of claim 9, wherein the one or more display parameters comprise temperature, current frequency, brightness, panel physics, or any combination thereof associated with the display pixel.

11. Circuitry comprising:

gray-to-luminance conversion circuitry configured to convert image data corresponding to a display pixel of a plurality of display pixels of an electronic display from a gray level to a luminance value;

non-uniformity correction circuitry configured to apply a first correction to the image data by adjusting the luminance value of the display pixel according to a first gain mask; and luminance-to-digital code conversion circuitry configured to apply a second correction to the image data by converting the luminance value to a digital code based at least in part on a curve associated with an anode on which the display pixel is disposed, wherein the curve is based at least in part on one or more display parameters associated with the display pixel, a position of the display pixel, or both.

12. The circuitry of claim 11, wherein the non-uniformity correction circuitry is configured to apply a third correction to the image data by adjusting the luminance value of the display pixel according to a per-anode gain mask.

13. The circuitry of claim 11, wherein the digital code comprises the gray level according to the first correction and the second correction.

14. The circuitry of claim 11, wherein adjusting the luminance value of the display pixel according to the first gain mask comprises applying a gain value to a single display pixel, a group of display pixels, display pixels located in a same region, a set of display pixels driven by a same micro-driver, or any combination thereof.

15. The circuitry of claim 11, wherein the digital code is utilized by a micro-driver to drive a micro light-emitting diode (micro-LED).

16. A method comprising:

receiving, via processing circuitry, image data corresponding to a display pixel of a plurality of display pixels configured to display image content on an electronic display;

converting, via the processing circuitry, a gray level of the image data into a luminance value;

adjusting, via the processing circuitry, the luminance value of the display pixel according to a gain mask to partially correct non-uniformity associated with the display pixel; and converting, via the processing circuitry, the luminance value to digital code based on a curve associated with an anode on which the display pixel is disposed, wherein the curve is selected from among a plurality of curves based at least in part on one or more display parameters associated with the display pixel, a position of the display pixel, or both.

17. The method of claim 16, wherein the processing circuitry is disposed within the electronic display.

18. The method of claim 16, wherein the plurality of curves comprises fewer curves than a total number of anodes of the electronic display.

19. The method of claim 16, wherein the plurality of curves comprises a number equal to or less than a total number of anodes coupled to a micro-driver of the electronic display.

20. An article of manufacture comprising one or more tangible non-transitory machine-readable media comprising instructions that cause processing circuitry to:

perform a first non-uniformity correction to first image data for display on a first display pixel coupled to a first anode of an electronic display, wherein the first non-uniformity correction performed on the first image data differs from a second non-uniformity correction applied to second image data for display on a second display pixel coupled to the first anode of the electronic display; and perform a third non-uniformity correction to the first image data based at least in part on a curve associated with the first anode, wherein the third non-uniformity correction performed on the first image data is the same as a fourth non-uniformity correction applied to the second image data for display on the second display pixel coupled to the first anode of the electronic display.

21. The article of manufacture of claim 20, wherein the instructions cause the processing circuitry to perform the first non-uniformity correction at least in part by applying a per-pixel gain to the first image data.

22. The article of manufacture of claim 21, wherein the instructions cause the processing circuitry to perform the fourth non-uniformity correction to the second image data based at least in part on the curve associated with the first anode.

23. The article of manufacture of claim 20, comprising instructions to cause the processing circuitry to receive the curve associated with the first anode from memory comprising a lookup table, wherein the lookup table identifies the curve from among a plurality of curves associated with respective anodes on which respective display pixels of a plurality of display pixels are disposed.

* * * * *